United States Patent
Cohen et al.

(10) Patent No.: US 6,622,099 B2
(45) Date of Patent: Sep. 16, 2003

(54) FREQUENCY DOMAIN AUTO-TUNE FOR AN INTERNAL MOTOR CONTROLLER

(75) Inventors: Ilan Cohen, Doar Na Sharon Tichon (IL); Eran Katzir, Rosh Hain (IL); Oren Kidron, Tel-Aviv (IL)

(73) Assignee: Kollmorgen Corporation, Simsbury, CT (US)

( * ) Notice: Subject to any disclaimer, the term of this patent is extended or adjusted under 35 U.S.C. 154(b) by 107 days.

(21) Appl. No.: 09/874,729

(22) Filed: Jun. 5, 2001

(65) Prior Publication Data

US 2002/0019715 A1 Feb. 14, 2002

Related U.S. Application Data

(60) Provisional application No. 60/225,197, filed on Aug. 14, 2000, and provisional application No. 60/225,198, filed on Aug. 14, 2000.

(51) Int. Cl.$^7$ ................................................. G06F 3/00
(52) U.S. Cl. ............................. 702/75; 702/68; 702/69; 702/79; 702/106
(58) Field of Search ............................... 702/65, 66, 68, 702/69, 79, 106, 107, 111, 177, 75; 700/28, 31, 37, 170; 318/560, 565.22, 606

(56) References Cited

U.S. PATENT DOCUMENTS

| | | | |
|---|---|---|---|
| 4,418,381 A | * 11/1983 | Molusis et al. ............. | 364/131 |
| 4,882,526 A | 11/1989 | Iino et al. .................... | 318/561 |
| 5,155,797 A | 10/1992 | Nomura et al. ............. | 388/815 |
| 5,406,496 A | 4/1995 | Quinn ......................... | 364/484 |
| 5,587,899 A | 12/1996 | Ho et al. ..................... | 364/157 |
| 5,818,714 A | * 10/1998 | Zou et al. .................... | 364/154 |
| 5,880,415 A | * 3/1999 | Colby et al. ................. | 187/393 |
| 5,909,018 A | * 6/1999 | Vecchiotti et al. .......... | 187/393 |
| 5,929,400 A | * 7/1999 | Colby et al. ................. | 187/393 |

* cited by examiner

*Primary Examiner*—Marc S. Hoff
*Assistant Examiner*—Felix Suarez
(74) *Attorney, Agent, or Firm*—Morgan & Finnegan, L.L.P.

(57) ABSTRACT

A built-in auto-tuning system of a motor control system provides an auto-tuning of the motor control system. The built-in tuning system generates and applies a random noise test signal to the controller. In response to the test signals, the tuning system obtains response data such as the gains and phases over a wide range of operating frequencies. Based on the received data, the tuning system generates an open-loop Bode plot of the control system. The tuning system then calculates the phase and gain margins of the control system. The calculated gain and phase margins are compared with a set of predetermined values by the tuning system to automatically adjust the compensation parameters of the motor control system for a stable operation.

13 Claims, 7 Drawing Sheets

FREQUENCY DOMAIN AUTO-TUNE FOR AN INTERNAL MOTOR CONTROLLER

This application claims priority from provisional U.S. Patent Application Serial No. 60/225,197 entitled FREQUENCY DOMAIN AUTO-TUNE FOR A MOTOR CONTROLLER filed on Aug. 14, 2000, and provisional U.S. Application Serial No. 60/225,198 entitled SYSTEM AND METHOD FOR PERFORMING ANALYSIS OF MOTOR DRIVE ELECTRONICS filed on Aug. 14, 2000, the entirety of which are incorporated by reference herein.

FIELD OF THE INVENTION

This invention relates to a method and system for an auto-tuning of a controller. More particularly, the present invention relates to a method and system by which a controller of a motor control system is automatically tuned using a built-in auto-tuning system.

BACKGROUND OF THE INVENTION

A control system (e.g., motor control system) generally includes a controller and a system to be controlled which is connected to the controller through a feedback loop. In operation, the system is controlled by the output of the controller and the system output is fed back via a feedback path where it is subtracted from a reference input to form an error signal. This error signal is processed by the controller to generate a modified control input to the system. The controller often needs tuning because of changes in characteristic properties such as motor/load inertia, resonance due to a compliance, backlash and friction etc.

A controller usually includes filters or compensators. A compensator is a filter that is designed to provide a specific gain and phase shift to the controlled system, usually at a specific frequency. PID (Proportional—Integral—Derivative) type compensators are widely used because of their general purpose design. As used herein, the term a PID type compensator encompasses all variations and combinations of the compensation functions of the PID compensator, including P, PI and PD configurations. A PID type compensator is so named because its control output is derived from a weighted sum of the input, the integral of the input, and the derivative of the input. The PID type compensator controls in a proportional control mode, integral control mode, and differential control mode simultaneously so that the system reaches a target value in a stable state within as fast a period of time as is possible. Such compensators include a proportional amplification unit with a proportional gain parameter $K_P$, an integration unit with an integration gain parameter $K_I$, and a derivative unit with a derivative gain parameter $K_D$.

Tuning a controller is the process of setting or adjusting the compensator gains (e.g., KP, KI, KD) of the controller to achieve desired performance. For example, since the stability of a motion controller may vary due to the interaction with load condition, compensator gains of the controller must be tuned (i.e., adjusted) regularly to operate effectively in a specific application of the controller. Controllers that are poorly tuned either act too aggressively or too sluggishly. When the uncertainty in the disturbance or process dynamic characteristics are large, the tuning of a controller is often difficult. As a result, the tuning process in the past has usually required a highly experienced technician who tuned the system manually. However, while manual tuning of a controller is possible, it is often tedious and inaccurate, especially when characteristics of the controlled process change over time. In addition, process non-linearity of the controller makes it difficult to manually bring the system into controlled operation.

Auto-tuning is a process in which the compensator gains of a control system are automatically adjusted so that the tuning process does not require an engineer or a highly experienced technician. Many techniques have recently been proposed for the auto-tuning of controllers, such as relay feedback, pattern recognition techniques, and correlation techniques. Such auto-tuning techniques are, however, not cost-effective and time-efficient when used in a practical control system.

A Dynamic Signal Analyzer (DSA) is commonly used to perform a frequency response analysis which can provide a frequency domain tuning. The DSA generates a multi-frequency signal which can be injected into the control system as a command. The response to the injected signal is returned to the DSA and analyzed usually employing a Bode-Plot. A DSA unit, however, is relatively expensive, often costing several times more than the controller. Moreover, the number of points available to the DSA for injecting test signals is often fewer than desired. As a result, the use of such equipment is usually limited to the research laboratory where internal access can be obtained and is not generally available at the customer site.

SUMMARY OF THE INVENTION

The above-identified problems are solved and a technical advance is achieved in the art by providing a method and system that perform an auto-tuning of a motor based on a frequency response function.

Instability occurs when the loop gain of a control system is 0 dB (i.e., unity gain or greater) and phase is $-180°$ or more (i.e., positive feedback). In the frequency response function of the control system, the gain crossover frequency (i.e., a frequency of the 0 dB crossing) and the phase crossover frequency (i.e., a frequency of $-180°$ crossing) are determined. A phase margin (PM) is the difference in the phase value at tile gain crossover frequency and $-180°$. A gain margin (GM) is the difference in the gain value at the phase crossover frequency and 0 dB. The gain and phase crossover frequencies are the boundaries of the stable region. The gain and phase margins indicate a safe operating range within the boundaries.

In accordance with an aspect of the invention, there is provided a built-in auto-tuning method and system of a motor control system in which a random noise signal is internally generated and applied to the motor control system along with normal control commands. The random noise signal is frequency rich signal including a wide range of operating frequencies. By using the frequency rich random noise signal, a simultaneous uniform excitation of the whole frequency range is achieved in a single run usually taking less than one second. Frequency response data (e.g., gains and phases) for the random noise test signals are received. The received data reflect responses of the motor control system at a wide range of frequencies injected through the random noise signal and are enough to generate a frequency model of an open-loop system. The gain and phase margins of the control system are calculated at the respective crossover frequencies. The calculated gain and phase margins are compared with a set of predetermined gain and phase margins which are desirable to the operation of the motor control system in a particular application. If the calculated gain and phase margins are outside the preferred range, the built-in auto-tuning method and system adjust the initial controller parameters during a normal operation and repeats the auto-tuning sequence to bring the gain and phase margins within the preferred range. By trial and error, the controller parameters are automatically adjusted until a suitable gain and phase margins are found for the particular applications.

The response data can be displayed external to the controller by generating an open-loop Bode plot using a least square fit criteria.

Other and further aspects of the present invention will become apparent during the course of the following detailed description and by reference to the attached drawings.

DETAILED DESCRIPTION

Figure 1:
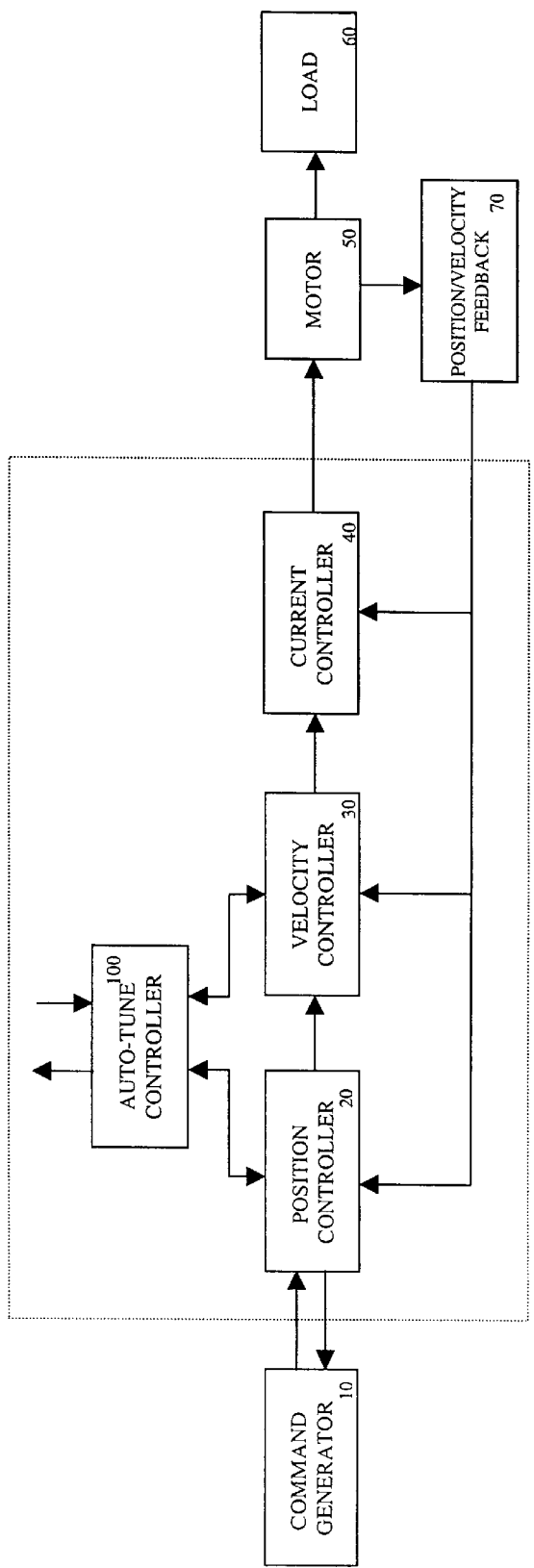
FIG. 1 illustrates an overview of a motor control system in which a built-in auto-tuning system is implemented as an embodiment of the present invention.

FIG. 1 illustrates an overview of a motor control system in which a built-in auto-tuning system is implemented. The motor control system includes a position controller 20, velocity controller 30, current controller 40, motor 50, load 60 and position feedback 70. A command generator 10, issues commands for the control of the motor and load. The command generator is connected to the position controller of the motor control system through command and response paths. Upon receiving commands from the command generator, the position controller generates a velocity command for the velocity controller which in turn generates a torque command for the current controller. The torque command is converted into a current signal in the current controller and the current signal is then input to the motor. The position feedback feeds back the position and velocity information from the motor to the current controller, velocity controller and position controller where the feedback output is subtracted from a reference input to form an error signal.

The control system in FIG. 1 further includes an auto-tune controller 100 which is configured to perform an auto-tuning of the control system. The auto-tune controller is connected to both the position controller and velocity controller tuning either or both of the controllers. The auto-tune controller is preferably implemented inside either of the two controllers in this embodiment. Alternatively, the auto-tune controller may be implemented outside the two controllers as a separate unit. A personal computer may be utilized for this separate auto-tune controller implementation.

Figure 2:
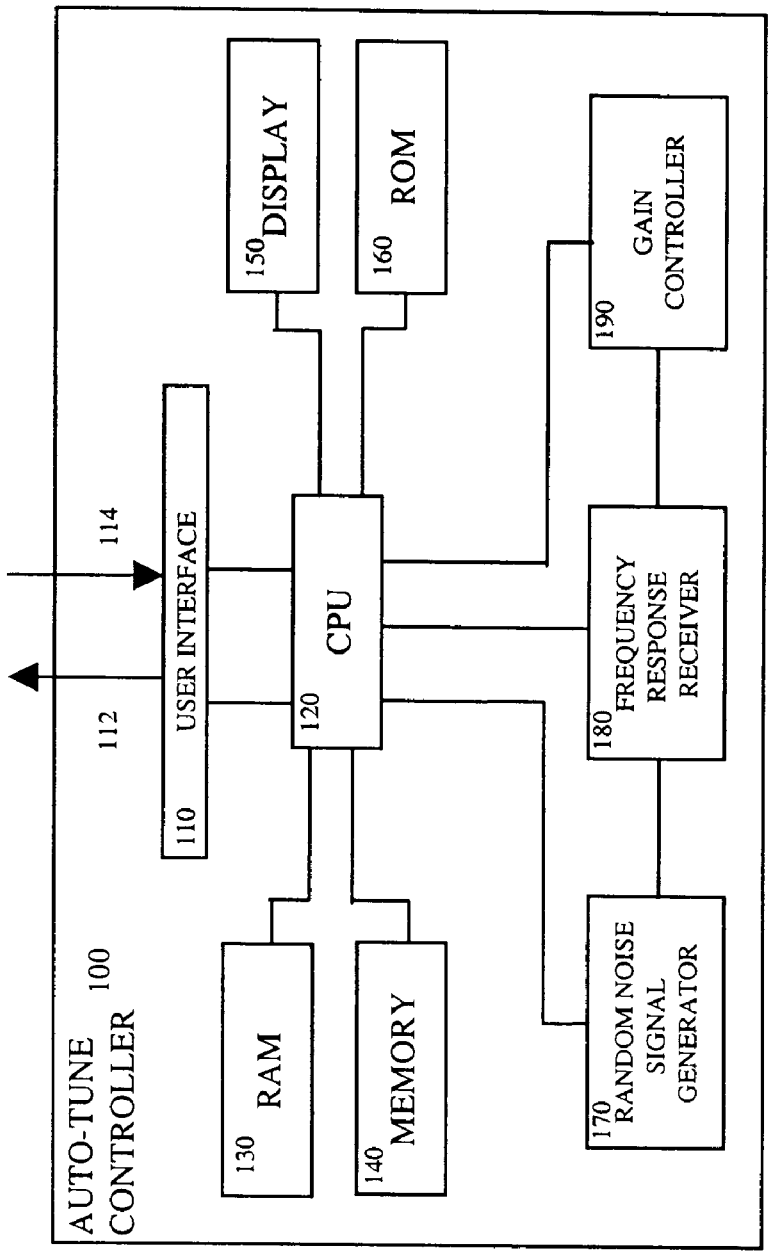
FIG. 2 is a block diagram of an exemplary embodiment of the auto-tuning system as shown in FIG. 1.

FIG. 2 is a block diagram of an exemplary embodiment of auto-tune controller 100 shown in FIG. 1. The auto-tune controller includes the basic elements such as a CPU 120, RAM 130, Memory 140 and ROM 160. Further included is a user interface 110 for communication with a user and display 150 for displaying the test results (e.g., a frequency response function). The user interface may also be used to connect to a personal computer to download/upload data and software from the auto-tune controller.

The auto-tune controller further includes a random noise signal generator 170, frequency response receiver 180 and gain controller 190. The random noise signal generator generates frequency rich test signals (e.g., multiple frequency signals in an excitation) and injects the test signals to the position controller and/or velocity controller in addition to the normal control signals. The frequency response receiver receives the output signals (e.g., gains and phases), which are in response to the injected test signals and control signals. Upon receiving the output signals, the frequency response receiver either sends the received signal to the CPU for a frequency domain analysis or sends to the memory for later processing. The gain controller receives control information from the CPU and adjusts the gains of the position and/or velocity controllers. Other functional blocks may be added depending on specific tuning method.

Figure 3:
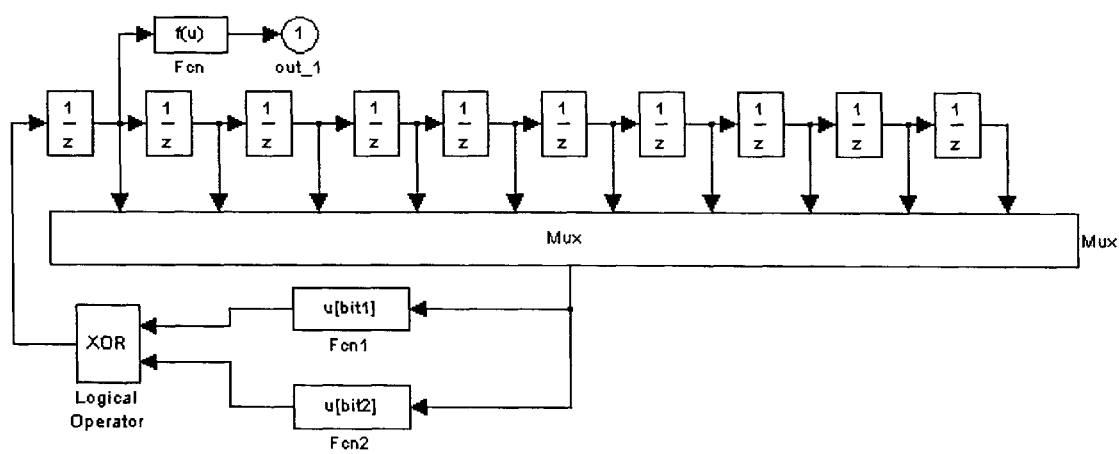
FIG. 3 is an exemplary embodiment of the random noise signal generator of FIG. 2.

FIG. 3 is an exemplary embodiment of the random noise signal generator of FIG. 2. The generator includes multiple shift registers communicating with a multiplexer and the output of the multiplexer is input to a XOR gate working as a logical operator. The output of the XOR gate is input to one of the shift registers which produces a random noise signal.

The auto-tune controller is mainly implemented with the following functionality to perform the auto-tuning process; issuing commands to initiate and terminate the auto-tuning process while the motor control system is in normal operation; generating and applying a test signal which has multiple frequency points to either or both of the position and velocity controllers; receiving response data from either or both of the position and velocity controllers; calculating the characteristic values (e.g., crossover frequencies and phase and gain margins); comparing the characteristic values with a set of predetermined values; and, based on the comparing, adjusting the controller gains (e.g., proportional and/or integral gains etc.) to bring the characteristic values within a predetermined range of values.

Figure 4:
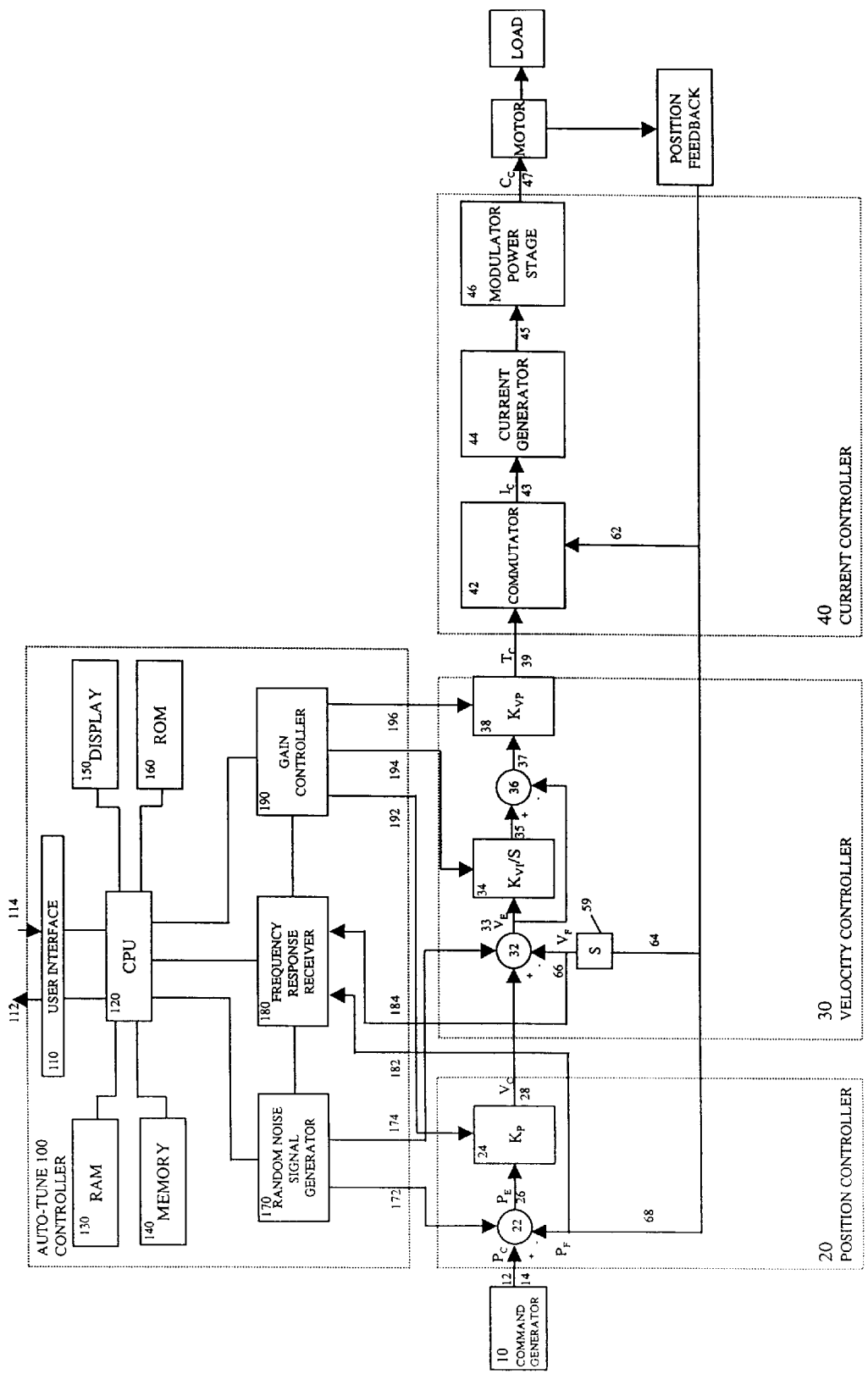
FIG. 4 is a detailed view of the motor control system of FIG. 1.

FIG. 4 is a detailed view of the motor control system of FIG. 1 in which the auto-tune controller is connected with a cascaded type position and velocity controllers as an embodiment. The auto-tune controller is connected to the position and velocity controllers through multiple signal paths. While motion control begins with the ability to produce torque, most motion control applications need more than just controlled torque. Controller loops are usually closed around torque to control the position and/or velocity of the controlled system. This requires not only sensors (e.g., resolvers or encoders) for the position and velocity feedback but also the appropriate control algorithms (e.g., compensators) in the position and velocity controllers.

The gains of the compensators (e.g., $K_{VI}/S$, $K_{VP}$) of the velocity controller generally depends on the behavior of the driven mechanical system during an operation (e.g., interaction between motor and load inertia). However, the main problem of the behavior is the compliance between motor and load inertia which can generate a resonance of two mass system. If the velocity controller bandwidth is above the resonant frequency, only the motor inertia is defining the velocity controller tuning while in a system with a stiff coupling (i.e., low compliance), the sum of motor and load inertia is used for the velocity controller compensation. As a result, an auto-tune algorithm has to estimate the effective inertia of the motor and load to get an optimized controller parameter set. For the position controller, the velocity controller appears to be a two-pole low-pass filter with a specified bandwidth and damping. Knowing these characteristic parameters, the gains of the position controller can be determined relatively easily.

The regular operation of the cascaded position and velocity controllers without the auto-tune controller is described below.

The position controller takes a position command 12 from the external command generator, comparing it to a position feedback 68 to generate a position error signal 26. The position error signal is processed with a position compensator 24 (i.e., a proportional controller) to generate a velocity command 28. The velocity controller takes the velocity command and compares it to a velocity feedback 66 to generate a velocity error signal 33. The velocity error signal is processed with velocity compensators 34, 38 (i.e., a proportional-integral controller) to produce a torque command 39. The torque command is then fed into a commutator 42 of the current controller where the torque command is converted into a current command 43 which operates in synchronism with the rotor position. The current command is fed into a current generator 44 and a modulator 46, sequentially, generating a control command 47 for the motor. The position feedback includes an encoder or resolver to relay the shift position information from the motor back to the current, velocity and position controllers.

The operation of the auto-tune controller for tuning the cascaded position and velocity controllers will now be described with reference to the flow chart of FIG. 5 along with the detailed view of the motor control system of FIG. 4.

Figure 5:
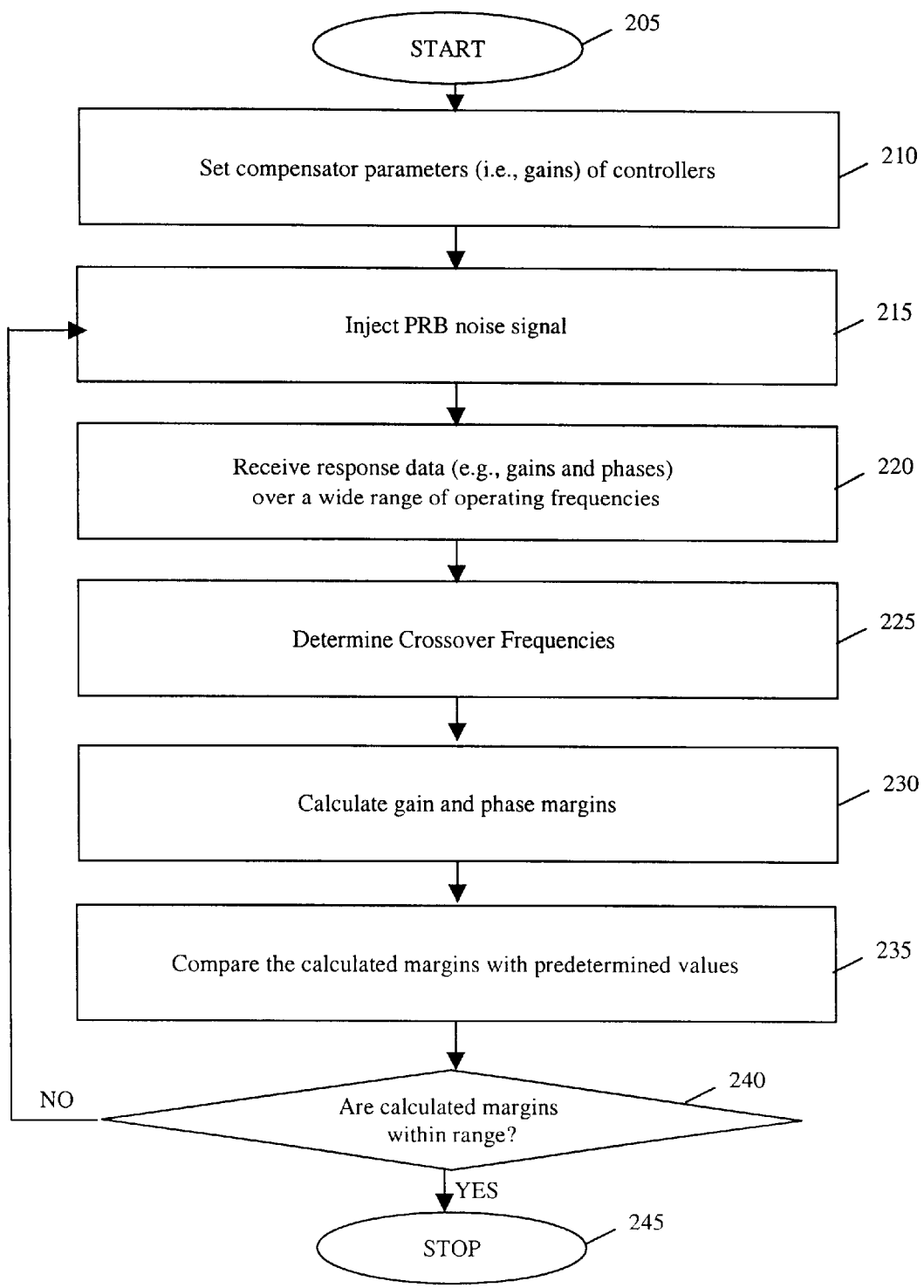
FIG. 5 is a flow chart illustrating an exemplary process by which the built-in auto-tuning system performs the tuning process.

FIG. 5 is a flow chart illustrating an exemplary tuning process.

In step 210 of FIG. 5, upon receiving a command from the CPU of the auto-tune controller, the gain controller sets initial gains of the position and velocity controllers. The initial gain values are set to be relatively low values that produce stable operation of the motor control system. For example, proportional gain is set to a low starting value of KP=0.5. The integral action time is then set to $T_n=a/2\pi f_{cross}$ with a=3 for a critical damping case.

In step 215, the random noise signal generator injects a test signal, along with commands for regular operation, to the loop of the velocity controller assuming that the tuning process is directed to the velocity controller. Alternatively, the random noise signal generator may inject the test signal to the loop of the position controller.

Figure 6:
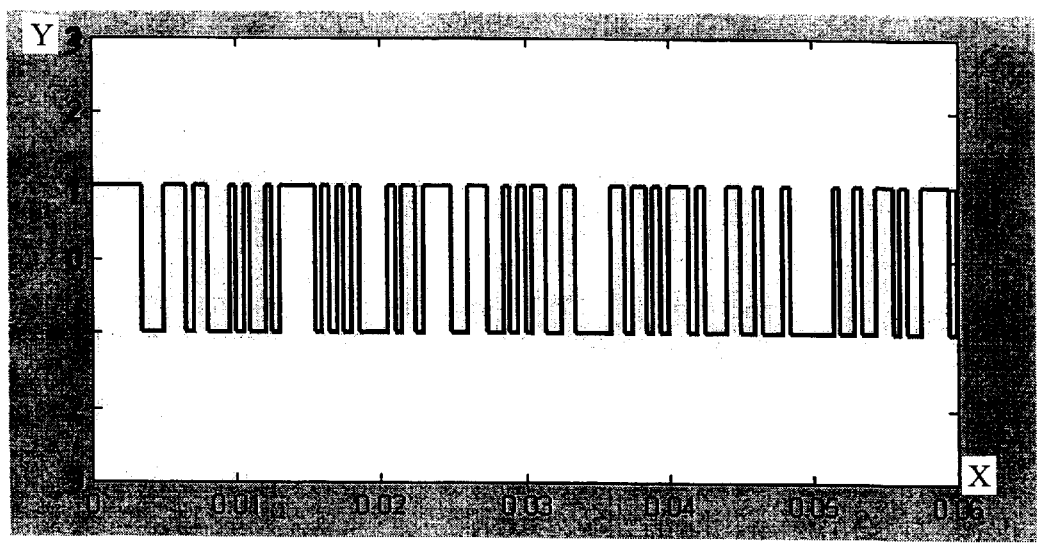
FIG. 6 shows an example of random noise (PRB) signal generated by the random noise signal generator.

FIG. 6 shows an example of pseudo random binary (PRB) noise signal generated by the random noise signal generator. Since the PRB noise signal is a deterministic signal, there is no need for lengthy averaging of the measurements. By applying a frequency rich random noise signal, simultaneous uniform excitation of the whole frequency range is performed within a short time interval (e.g., less than 1 second). This increases the possibility of detecting critical frequencies (e.g., crossover frequencies) within a short period of time. Under a given limit of noise amplitude range, the PRB noise is the one with maximal power density because of its binary nature. This means that less time is required compared to other noise distributions to put the same level of noise power.

In step 220 of FIG. 5, in response to the test signal, the frequency response receiver receives response data (i.e., gains and phases at each frequency). For example, the frequency response receiver may receive the gain and phase values at multiple frequency points at signal path 66 where feedback signal from the position feedback is differentiated by a differentiator 59. The received data reflect the gain and phase values over a wide range of operating frequencies that were included in the PRB noise signal as an input. The received data may be stored in the memory of the auto-tune controller.

In step 225, the crossover frequencies are determined. As the frequency increases, the gain crossover frequency is the frequency at the open-loop Bode plot where the gain becomes less than unity. The phase crossover is the frequency where the phase changes from negative to positive.

In step 230, the CPU of the auto-tune controller calculates the gain and phase margins of the control system based on the phase and gain crossover frequencies as determined in step 225. The phase margin is calculated by subtracting −180° from the obtained phase value at the gain crossover frequency. The gain margin is calculated by subtracting the obtained gain value at the phase crossover frequency from 0 dB. The calculated margins may be stored in the memory of the auto-tune controller.

Using the stored data at step 220, the CPU of the auto-tune controller can be used to generate an open-loop Bode plot display when desired. The generalized least square method used for the algorithm for generating the Bode plot is a well tested method which gives the optimal solution to the filter equation in the least square sense. For example, the filter which fits best between the output and input is found, then its frequency response is computed etc. The algorithm involves computing the singular value decomposition of the regression matrix. The least square fit method is found specifically suitable for electro-mechanical system identification due to its robustness to cyclic input disturbance.

Figure 7:
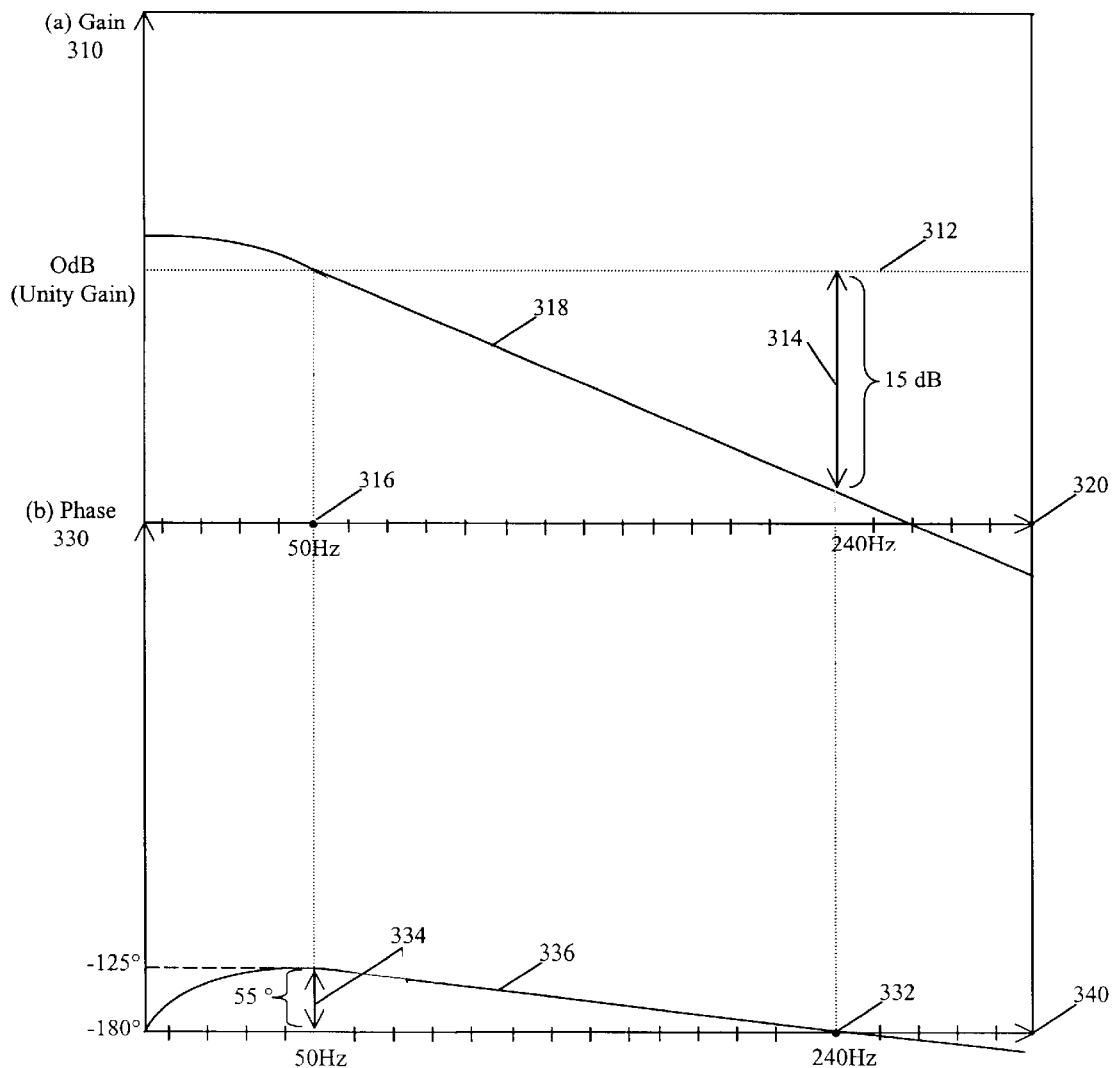
FIG. 7 is an example of an open-loop Bode-Plot.

FIG. 7 is an example of an open-loop Bode plot 300 that may be generated by the CPU of the auto-tune controller. The Bode-Plot includes a gain plot 310 and phase plot 330 using the same frequency reference 320, 340. Alternatively, other types of frequency response function such as the closed-loop Bode-Plot and step responses may be utilized. The bandwidth and peaking values are calculated in the closed-loop Bode-Plot, while the over shoot and rise time are measured in the step responses for the stability analysis of a controller.

The generated Bode plot may be displayed on a personal computer and an operator may use the displayed information for a fine tuning process of the controller.

Referring again to FIG. 7, the Bode-Plot shows a gain crossover frequency point 316 at 50 Hz point and the corresponding phase margin of 55° obtained at the gain crossover frequency. The Bode-Plot also shows a phase crossover frequency point 332 at 240 Hz point and the corresponding gain margin of 15 dB obtained at the phase crossover frequency.

In step 235 of FIG. 5, the CPU of the auto-tune controller compares the calculated gain and phase margins with a set of predetermined values. For example, while different applications require different values of the gain and phase margins, experience teaches that for most applications the gain margin should be between 10 and 25 dB; the phase margin should be between 35° and 80°. In FIG. 7, for example, the gain margin 15 dB and the phase margin 55° are within the ranges of 10–25 dB for the gain margin and 35°–80° for the phase margin. These values are stored in the memory of the auto-tune controller by an operator before the tuning process begins. These predetermined margins can be modified for specific applications. For example, if a control system needs a faster response, the gain and phase margins may be narrowed. If a control system requires a more stable operation, the margins may be widened.

In step 240, the CPU of the auto-tune controller determines whether the calculated gain and phase margins are within a set of predetermined values. If the calculated gain and phase margins are within the set of predetermined values, the CPU issues a command to stop the auto-tuning process at step 245. Referring to the current example, the calculated gain and phase margins (i.e., 15 dB and 55°) are within the range of the predetermined values (i.e., 10–25 dB for the gain margin and 35°–80° for the phase margin).

If the calculated gain and phase margins are outside the range of the predetermined values, the auto-tuning process proceeds back to step 210 where the CPU issues a command to the gain controller to increase the gains of the velocity controller. One or both of the compensator gains (i.e., proportional or integral gains) may be re-set by the gain controller. After adjusting the gains, the auto-tuning process is reiterated until the calculated gain and phase margins are within a predetermined range.

The inventive method and system described above provide many advantages for the quality control of a motor control system. For example, the algorithm works as an internal stand-alone auto-tuning system and there is no additional hardware required. The operator of the tuning system need no special controller tuning education and controller tuning is fully reproducible (e.g., two different persons get the same result). Only +/−15° shaft rotation are required for tuning. Moreover, the controller tuning includes specific mechanical behaviors like resonance, friction and inertia etc.. Additional advantages include the following: target bandwidth is found during the process rather than predefined, controller update relies on comprehensive information obtained about the control system, information obtained during the process offers insights as to the system's limit of performance, the time for an auto-tuning is short due to the concentrated nature of the frequency data.

The many features and advantages of the present invention are apparent from the detailed description, and thus, it is intended that the appended claims cover all such features and advantages of the invention which fall within the true spirit and scope of the invention.

Furthermore, since numerous modifications and variations will readily occur to those skilled in the art, it is not desired that the present invention be limited to the exact construction and operation illustrated and described herein, and accordingly, all suitable modifications and equivalents which may be resorted to are intended to fall within the scope of the claims. For example, much of the functionality described above as being provided by the auto-tune controller alternatively could be incorporated into the functionality provided by a chip or a CPU. Moreover, much of the functionality of the position/velocity/current controllers may also be incorporated into a chip or a CPU with the auto-tune controller.

What is claimed is:

1. A built-in auto-tuning system within a controller of a motor control system comprising:
   (i) means for injecting a random noise test signal into a loop of the controller;
   (ii) means for receiving frequency response data which reflects the responses of the motor control system to said random noise test signal;
   (iii) means for determining gain and phase crossover frequencies based on the received data;
   (iv) means for calculating a gain margin from said response data;
   (v) means for calculating a phase margin from said response data; and
   (vi) means for adjusting compensation parameters of the controller to set the gain and phase margins within a set of predetermined values.

2. The auto-tuning system of claim 1 further comprising means for providing a video display for displaying a Bode plot based on said response data.

3. The auto-tuning system of claim 2, wherein said video display is on a personal computer.

4. The auto-tuning system of claim 1, wherein said random noise test signal is injected together with the normal command signal.

5. The auto-tuning system of claim 1, wherein said compensation parameters are one or more of the proportional, integral and derivative gains of the controller.

6. A method of tuning a controller of a motor control system with a built-in auto-tuning system including the step of:
   (i) injecting a random noise test signal into a loop of the controller;
   (ii) receiving frequency response data which reflects the responses of the motor control system to said random noise test signal;
   (iii) determining gain and phase crossover frequencies based on the received data;
   (iv) calculating a gain margin from said response data;
   (v) calculating a phase margin from said response data; and
   (vi) adjusting compensation parameters of the controller to set the gain and phase margins within a set of predetermined values.

7. The method of claim 6 further providing a video display for displaying a Bode plot based on the response data.

8. The method of claim 7, wherein said video display is on a personal computer.

9. The method of claim 6, wherein said random noise test signal is injected together with the normal command signal.

10. The method of claim 6, wherein said compensation parameters one or more of the proportional, integral and derivative gains of the controller.

11. A built-in auto-tuning system within a controller of a motor control system comprising:
   (i) a random noise signal generator for providing a random noise signal and to apply said random noise signal to a loop of the controller;
   (ii) a response receiver for receiving data reflecting the responses of the motor control system to said random noise signal;
   (iii) a gain controller for adjusting gains of the controller to set the gain and phase margins;
   (iv) a computer comprising a memory unit, a processing unit and a display unit, and being programmed to:
      (a) issue a command to the gain controller to set the gains for the controller;
      (b) issue a command to the random noise signal generator to inject a test signal to the controller;
      (c) receive the response data of the controller in response to the random noise signal;
      (d) determine the phase and gain crossover frequencies;
      (e) calculate phase and gain margins based on said crossover frequencies;
      (f) compare the calculated phase and gain margins with predetermined values; and (g) issue a command to said gain controller to adjust the gains when outside the range of said predetermined values.

12. The built-in auto-tuning system of claim 11, wherein said response data is displayed on a personal computer.

13. The built-in auto-tuning system of claim 11, wherein said random noise signal is injected together with the normal command signal.

* * * * *